Jan. 29, 1946.   R. R. BEEZLEY   2,393,735
LOCK-RING POSITIONER FOR BEARINGS
Filed May 26, 1945
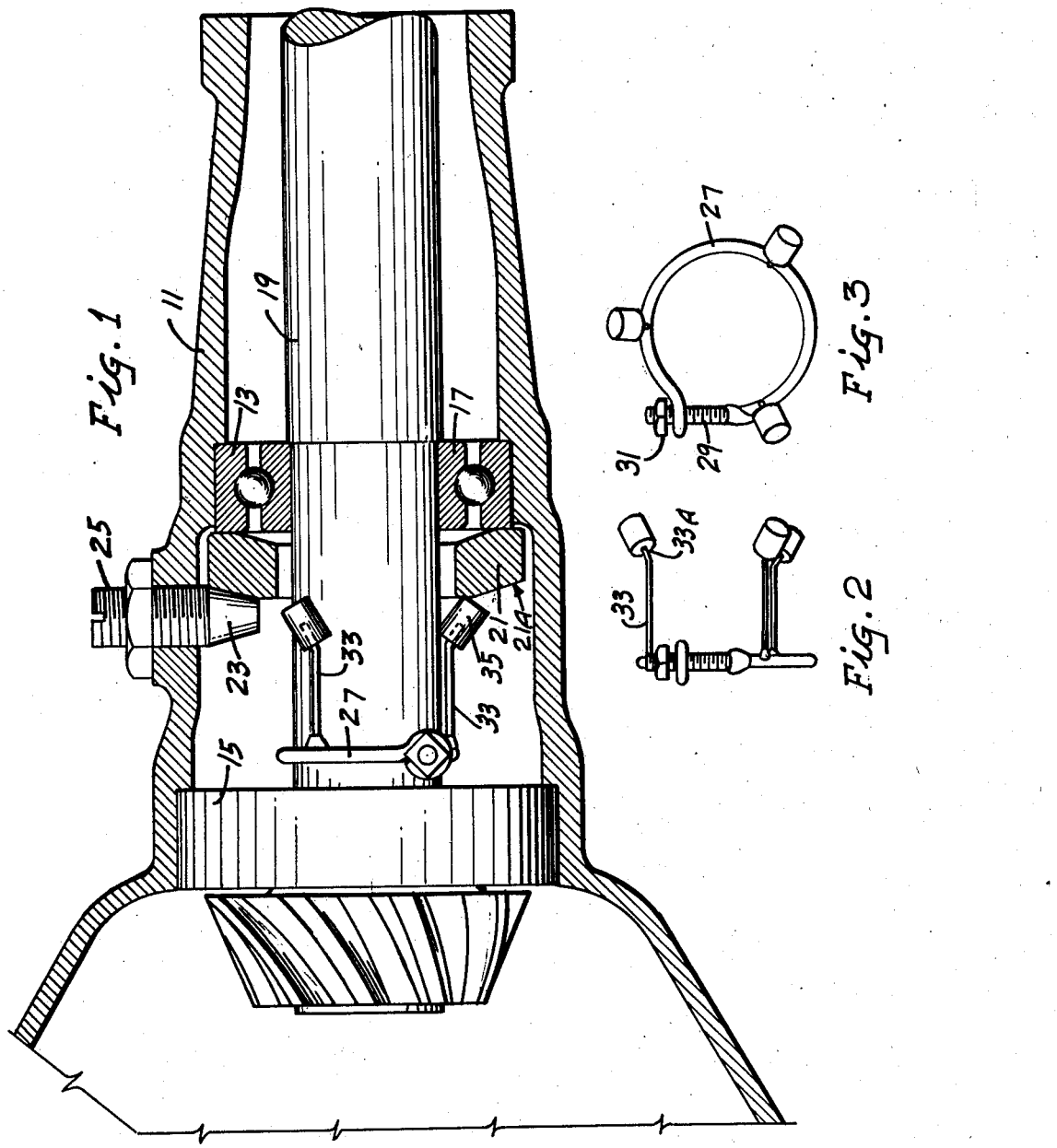
INVENTOR.
REGINALD R. BEEZLEY
BY
J. H. Weatherford
Atty.

Patented Jan. 29, 1946

2,393,735

UNITED STATES PATENT OFFICE 2,393,735

LOCK-RING POSITIONER FOR BEARINGS

Reginald R. Beezley, Memphis, Tenn.

Application May 26, 1945, Serial No. 595,984

3 Claims. (Cl. 308—189)

This invention relates to devices for temporarily holding locking rings for ball bearings in place during the installation of drive shaft assemblies, as of automobiles, in their housings.

In certain types of automobiles the drive shaft which carries the differential drive pulley is journalled in a pair of ball bearings spaced apart adjacent the pinion end of the shaft, the bearings being seated in a housing and the inner bearing being held in its seat by a locking ring. In installation, the shaft with the two bearings secured thereon and a locking ring loosely interposed between the bearings, is placed in the housing which has been counter-bored for the bearings. The two bearings are forced or lightly driven into place, and when placed are held by three screws which are engaged with the locking ring and seat it against the inner bearing. As the shaft assembly and housing are constructed, the locking ring is inaccessible during substantially the entire installation and is usually so displaced that it is impossible to engage the holding screws with it.

In assembling the holding rings may be stationary relatively to the shaft, but after assembly becomes stationary relatively to the housing and any connection to the shaft is a drag thereon and objectionable.

Numerous makeshift devices have been used for stabilizing the ring during assembly, paper sometimes being wrapped around the shaft, or strips of wood placed between the outer bearing and the ring for this purpose. All of these, however, introduce into the bearings foreign matter, which, to say the least, does not promote proper functioning or lubrication in subsequent use of the assembly.

The objects of the present invention are:

To provide a temporary stabilizer or positioner for the locking ring which is in part destroyed, but in which the destroyed portions are of a nature to be mixed with the lubricant in the housing and promote rather than retard lubrication;

To provide a simple and efficient stabilizer between subsequently relatively movable parts, which includes effaceable portions.

The means by which the foregoing and other objects are accomplished, and the method of their accomplishment, will readily be understood from the following specification upon reference to the accompanying drawing, in which:

Fig. 1 is a sectional elevation of the drive shaft housing of an automobile with the drive shaft and bearings secured in place therein, and my lock ring positioner as it appears before and after the completion of the installation and before turning movement of the shaft;

Fig. 2 is a side elevation of the preferred form of my positioner; and

Fig. 3 a corresponding end elevation.

Referring now to the drawing in which the various parts are indicated by numerals:

11 is a housing which has been counterbored to receive the outer races of a pair of ball bearings 13 and 15, the inner races of these bearings being mounted on a drive shaft 19 in usual manner. 21 is a lock ring which on its inner face is relieved so that it will seat only against the outer race of the inner of the bearings 13 and on its outer face. 21A is beveled for engagement with the tapered ends 23 of set screws 25, three of which are usually used to force the ring against the bearing 13 and hold it against displacement.

The ring stabilizer comprises a split annular clamp 27 which may be opened up and placed around the shaft 19 between the outer bearing 15 and the locking ring 21, and when so placed may be securely clamped, as by a threaded end 29 and nut 31. Rigidly projecting from this clamp are prongs 33, three of these prongs, spaced 120 degrees apart, preferably being used, which prongs have their outer ends 33A deflected outward from the shaft and carry blocks 35 which engage against the locking ring 21 and hold it firmly against the outer race of the bearing 13. The blocks are fragile and are composed of a compressed lubricant, such as graphite mixed with lubricant oil, and are of nature to disintegrate when broken up and mixed with the lubricant usually used in the housings. The deflection and length of the deflected portions are such that they lie radially inward and clear of the screws 25 in any position.

In making use of the device, the split clamp 27 is opened up and placed around the shaft 19 between the outer bearing 15 and the lock ring 21 of the drive shaft assembly. The ring 21 is centered and seated against the housing 13 and the stabilizer shifted along the shaft until the blocks 33 engage firmly adjacent the ring and hold it against the bearing. With the ring thus held and the screws 25 retracted or entirely removed, the shaft 19 is inserted through the housing and shifted to seat the bearings 13 and 15 in their respective housing counter-bores, the bearings usually being driven to place by tapping with a soft hammer on the end of the shaft, which tapping, unless the ring 21 be held, usually displacing the ring. After the bearings are seated the screws 25 are run into place, their tapered ends 23 engaging the beveled face 21A of the ring and jamming the ring solidly against the outer race of the bearing 13 and that race solidly against the end of the housing counter-bore.

Should the screws happen to seat on the blocks 35 of the stabilizer, they crush the blocks and destroy them, but this cannot occur until the screws are partially in place and in position to prevent dislodgement of the ring. If this does not occur the first turning movement of the shaft shifts the blocks against the screws and effects the same destruction.

The clamp and prongs continue to turn thereafter with the shaft, but not extending into the path of the screws 25, introduce no obstruction to rotation. The crushed blocks rapidly disintegrate and blend with the other lubricant in the casing.

I claim:

1. A stabilizer for temporarily positioning a normally loose holding-ring of a shaft and bearing assembly during installation in a housing, which stabilizer comprises a member split for engagement around said shaft, said member including means for effecting its clamping engagement to said shaft, a plurality of prongs extending along said shaft from said member and outwardly deflected adjacent said ring, and blocks carried by said prongs, said member and blocks being shiftable along said shaft into ring engagement, said blocks being of compressed lubricating materials, destroyable under turning movement of said shaft relatively to said housing after installation, and mixable with the lubricants in said housing.

2. Means for stabilizing a normally loose bearing-holding ring of a shaft and bearing assembly during installation of said assembly in a housing, which means includes a plurality of blocks disposed around said shaft, and means secured to and carried by said shaft, supporting said blocks against said ring to position said ring against said bearing during said installation, said blocks being formed of compressed lubricating materials, basically graphite, and being destroyable under turning movement of said shaft relatively to said ring subsequent to said installation.

3. Means for stabilizing a normally loose bearing-holding ring of a shaft and bearing assembly during installation of said assembly in a housing, which means includes a plurality of blocks disposed around said shaft, and means secured to and carried by said shaft, supporting said blocks against said ring to position said ring against said bearing during said installation, said blocks being inherently fragile and destroyable under turning movement with said shaft subsequent to said installation, all said materials being lubricants mixable with lubricants used in said housing.

REGINALD R. BEEZLEY.